(12) United States Patent
Franzius et al.

(10) Patent No.: US 9,848,529 B2
(45) Date of Patent: Dec. 26, 2017

(54) AUTONOMOUS LAWN MOWER, MODULE FOR AN AUTONOMOUS LAWN MOWER AND SYSTEM COMPRISING SUCH AUTONOMOUS LAWN MOWER AND MODULE

(71) Applicant: HONDA RESEARCH INSTITUTE EUROPE GMBH, Offenbach/Main (DE)

(72) Inventors: Mathias Franzius, Offenbach (DE); Nils Einecke, Offenbach (DE); Roman Dirnberger, Offenbach (DE); Ronny Borsdorf, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/079,115

(22) Filed: Mar. 24, 2016

(65) Prior Publication Data

US 2016/0302354 A1 Oct. 20, 2016

(30) Foreign Application Priority Data

Apr. 17, 2015 (EP) ..................................... 15001128

(51) Int. Cl.
*A01D 34/00* (2006.01)

(52) U.S. Cl.
CPC .................................. *A01D 34/008* (2013.01)

(58) Field of Classification Search
None
See application file for complete search history.

(56) References Cited

U.S. PATENT DOCUMENTS 3,570,227 A 3/1971 Bellinger
3,698,523 A 10/1972 Bellinger
(Continued)

FOREIGN PATENT DOCUMENTS

DE 103 27 223 A1 1/2005
EP 2 286 653 A2 2/2011
(Continued)

OTHER PUBLICATIONS

European Search Report dated Oct. 7, 2015 corresponding to European Patent Application No. 15001128.6.

*Primary Examiner* — Rodney Butler
*Assistant Examiner* — Tamara Weber
(74) *Attorney, Agent, or Firm* — Squire Patton Boggs (US) LLP

(57) ABSTRACT

The invention relates to an autonomous lawn mower comprising a control unit in electrical connection with electrical connection means, and at least one replaceable part. The electrical connection means is located such that connection and disconnection of the electrical connection means and its counterpart of the replaceable part can be performed when replacing the replaceable part. The module for such autonomous lawn mower can replace the replaceable part of the lawn mower and comprises a signal generation unit and a counterpart for the electrical connection means of the lawn mower for transmitting electrical signals to a control unit of the autonomous lawn mower. The autonomous lawn mower forms an autonomous lawn mower system together with the module.

14 Claims, 2 Drawing Sheets

(56) References Cited

U.S. PATENT DOCUMENTS

| | | | |
|---|---|---|---|
| 2003/0144774 A1 | 7/2003 | Trissel et al. | |
| 2006/0059880 A1 | 3/2006 | Angott | |
| 2011/0166701 A1* | 7/2011 | Thacher | A01D 34/008 700/245 |
| 2014/0121881 A1 | 5/2014 | Diazdelcastillo | |
| 2015/0163993 A1* | 6/2015 | Pettersson | A01D 34/008 701/28 |

FOREIGN PATENT DOCUMENTS

| | | |
|---|---|---|
| EP | 2 412 219 A1 | 2/2012 |
| WO | WO 90/04324 A1 | 5/1990 |
| WO | WO 2013/125991 A1 | 8/2013 |

* cited by examiner

AUTONOMOUS LAWN MOWER, MODULE FOR AN AUTONOMOUS LAWN MOWER AND SYSTEM COMPRISING SUCH AUTONOMOUS LAWN MOWER AND MODULE

BACKGROUND

Field

The invention relates to the field of autonomous lawn mowers.

Description of the Related Art

Autonomous lawn mowers are an increasing field. A few years ago autonomous lawn mowers have been presented and since then the capability of autonomous lawn mowers to detect obstacles and to fulfill their mowing task without interaction of a user have been improved. Of course the expectations of the customer also increased since then. Thus, autonomous lawn mowers with more sophisticated functions have been developed. But one problem is that the more sophisticated lawn mowers are quite expensive, because the included functionality necessarily needs higher effort in development and also production of such lawn mowers require more expensive parts. Thus, many potential customers will refrain from buying such sophisticated lawn mowers and rather buy a conventional lawn mower or at least a simpler autonomous lawn mower.

One example for such basic lawn mower is the self-propelled random motion lawn mower as disclosed in U.S. Pat. No. 3,570,227. This autonomous lawn mower needs a border wire for confining the mowing region and the lawn mower then randomly drives over the lawn until it reaches the border wire where its changes its direction. Since the only means for limiting the movement of the lawn mower is the border wire no intelligent functions can be implemented in such autonomous lawn mower and recognition of flat obstacles like cell phones lost on the lawn cannot be detected. In particular there is no possibility to upgrade from such basic autonomous lawn mower to a more intelligent or sophisticated system.

An example for a more sophisticated lawn mower is disclosed in EP 2 286 653 A2. This autonomous lawn mower is equipped with a camera and combines grass recognition with the output of a grass sensor. Due to capturing images of the environment more sophisticated or intelligent functions for controlling the autonomous lawn mower can be implemented. But the camera or the grass sensor are integrated in the autonomous lawn mower itself again and thus the customer has to decide before buying the lawn mower if he wants such functionality or whether he is satisfied with a cheaper one that then has no capability of upgrading the functionality of his mower.

Another possibility to provide an improved area detection in order to define non-grass regions that do not need to be mowed is described in DE 103 27 223 A1. The lawn mower described here comprises a camera and use of laser light to scan the ground but again these features are integrated in the lawn mower. Thus the lawn mower suffers the same problem as described above which means that an adaptation later on to new needs of the customer is not possible.

It is thus the object of the present invention to provide an autonomous lawn mower, a module for such autonomous lawn mower and a system consisting of the autonomous lawn mower and the module that enable a customer to decide later on whether a change of the module shall be performed so that additional features and functions can be added to the lawn mower by the new module. It is to be noted that in this respect even a part of a cover or housing of the mower is denoted as module. Module means any part that is intended to be replaced by another part, thereby making use of the same mechanical interface of the autonomous lawn mower.

The problem is solved by the autonomous lawn mower, the module for such autonomous lawn mower and the system comprising the autonomous lawn mower and the module as defined in the independent claims.

Advantageous features and aspects are defined in the dependent claims.

SUMMARY

The autonomous lawn mower of the present invention comprises a control unit that is in electrical connection with electrical connection means. Additionally there is at least one replaceable part forming a module. The electrical connection means are located such that connection and disconnection of the electrical connection means and its counterpart of the replaceable part and another replaceable part respectively can be easily performed when replacing the replaceable part. Easy in this regard means that no further disassembly of the lawn mower except for detachment of the replaceable part is necessary. The disconnection is performed either automatically by detaching the replaceable part, e.g. in case that a plug is connected directly to a housing of the replaceable part and the electrical connection means on the other side is mounted fixedly to housing or another rigid part of the mower, or at least the electrical connection means is directly accessible when the replaceable part is not detached Thus, now it is possible to replace the replaceable part (also called module) by another replaceable part that offers a different or improved functionality. Since the electrical connection means is located near the replaceable part and in particular in a way that the counterpart for the electrical connection means and the electrical connection means of the autonomous lawn mower can be connected and disconnected easily when the replaceable part is replaced, upgrading the autonomous lawn mower or adapting its functionality can be performed by the customer himself. This offers the possibility to start with a basic configuration of the autonomous lawn mower, e.g. having only a cover as a replaceable part (simplest version of a module), but the lawn mower being already prepared to receive a module with camera unit that can be electrically connected. Such module including a camera unit is configured to replace the initially used replaceable part and serves the same purpose as the replaced part but in addition further functions such as image capturing or the like. It is to be noted that the camera is used as a preferred example for explaining the addition of functionality, but of course any device or means that adds or adapts functionality can be used.

Since the electrical connection means is located such that connection and disconnection of the electrical connection means and its counterpart of the replaceable part can be performed when replacing the replaceable part it is easy to remove the old replaceable part and substitute it with a new one. No further assembly and disassembly is necessary and in particular such replacement then can be performed by the customer and user of the autonomous lawn mower himself. Since the replacement is quite simple and an electrical connection means dedicated for connecting a replaceable part, e.g. a new camera module, new developments regarding camera technique or even the processing of images captured by the camera can be added to the autonomous lawn mower later on. This results in a basic configuration that can be purchased by a customer not limiting the functionality for the future. In the past it would have been necessary to buy an entirely new system to obtain new functionality even in case that the propelling function and mowing function of the old autonomous lawn mower was still good. A basic configuration may be limited to controlling the driving of the autonomous lawn mower by bump sensors and border wire and without more sophisticated control to avoid obstacles as it is possible on the basis of image processing for obstacle detection and the like. If a costumer later on wants to improve the functionality of his autonomous lawn mower it is then possible to replace the initially used replaceable part by a new replaceable part that then includes for example a camera and maybe also an image processing unit can thus deliver signals to the control unit of the autonomous lawn mower which is already prepared to control the autonomous lawn mower on the basis of these signals. But since the camera unit is not provided initially the basic configuration of the autonomous lawn mower is cheaper. Thus, it is possible that the customer buys the basic configuration and later on if he is willing to spend further money for his comfort he can add such more sophisticated functions.

A module according to the invention that may substitute a previously used module or even the initially used module comprises a signal generation unit and a counterpart for the electrical connection means of the lawn mower. Thus, from the module (rather its signal generation unit) an electrical signal can be transmitted to the control unit of the autonomous lawn mower which is then used to control driving of the autonomous lawn mower.

In general the electrical connection means can be a connector that is attached to a harness of the autonomous lawn mower and that can be connected to a connector on the module's side. Of course also on the module side the connector may be connected to a harness of the module. Alternatively it is of course also possible that the electrical connection means is fixedly attached to the autonomous lawn mower (any rigid part thereof) and the counterpart is correspondingly and fixedly attached to the module without the use of a flexible harness so that the module can simply be inserted for example into a socket as electrical connection means.

It is to be noticed that the module is configured in such a way that it fulfills not only the requirements of the newly added function but also the function of the replaced part. That means in case that the replaceable part that was initially used is for example a part of a cover of the autonomous lawn mower, the autonomous lawn mower's module is designed in such a way that the cover function will also be present after replacing the replaceable part. In case of the old replaceable part being a cover this means that the replacing module has to cover the recess that is the result of detachment of the old replaceable part. This is achieve by designing the mechanical interface of all modules dedicated for a particular replacement of one type of lawn mower in the same way.

According to an advantageous aspect the control unit is configured to control a drive unit of the autonomous lawn mower on the basis of signals receivable via the electrical connection means. This means that when nothing is attached to the electrical connection means the autonomous lawn mower can provide the self-propelling function on the basis of, for example, simple obstacle detection and/or borderline detection and random drive. This could be achieved by using the commonly known borderline technique as mentioned above with respect to the state of the art and additionally provide bump sensors in order to change the driving direction after contact with an obstacle. If then the replaceable part is replaced by a new replaceable part being a module according to the invention which is connected by its counterpart and the electrical connection means and which transmits electrical signals to the control unit of the autonomous lawn mower these signals are taken into consideration and information contained therein is used for controlling the drive unit of the autonomous lawn mower. In particular it is possible that the module comprises a camera and that image signals are transferred to the control unit. In that case the processing of the image signals is performed in the control unit of the autonomous lawn mower.

It is furthermore even more preferred that the information from images captured by image capturing means (camera, laser scanner or similar units) is processed in the module itself and thus signals are generated by the module itself that allow assisting control of the autonomous lawn mower on the basis of images captured by the camera, for example. Such signals can include information about a position and size of an obstacle relative to the lawn mower or even instructions to change the direction for driving.

Furthermore it is advantageous if the electrical connection means comprises a power connector and/or a communication connector. Such communication connector even more preferably is a CAN bus connector. Using such standardized bus connection has the advantage that it is easier to develop a plurality of different modules that all use the same communication protocol. By doing so it is possible to provide a greater variability of the autonomous lawn mower by offering a plurality of modules that can be used as replaceable parts that offer different functionality without the need for an adaptation on the mower side.

It is particularly preferred that the replaceable part is configured to form a service lid. Such service lid is present in most cases in some form anyway and thus the design of the autonomous lawn mower does not need to be changed to a large extent. It is then possible to still maintain the function of a service lid by the module, but because of the connection by means of the electrical connection means additional functions can be provided by the replacing replaceable part, i.e. the module according to the invention. The service lid for example covers a height adjustment means or adjusting the cutting height of the autonomous lawn mower or provides access to a control panel dedicated for programming the lawn mower.

Furthermore, it is advantageous if the control unit is updatable via the electrical connection means. In that case it is in particular preferred that in case that a module is connected with the electrical connection means, the update function is triggered by just connecting the module to the autonomous lawn mower. For enabling the module to trigger and perform the update process, there is a storage comprised in the module on which software for the control unit of the autonomous lawn mower is stored. After attaching the module to the autonomous lawn mower, the update will be performed automatically.

It is furthermore desirable that the autonomous lawn mower comprises a plurality of replaceable parts and respective electrical connections over which connected modules can communicate with each other. This can even comprise different environment perception modules such as a camera module and additionally a laser sensor module, information of which is used all together in order to generate control signals for the control unit. Again, this could be performed by using a processing unit of one of the modules in order to process the information of the different perception modules or the modules can be configured to provide only information about the captured images by, for example, the camera and a laser sensor to the control unit of the autonomous lawn mower where then a processing of the information is performed. Another example is that a separate module is used that provides communication functionality and that can receive and transmit the captured images or the image stream via the respective connection means.

Since it becomes more and more common that the control of such autonomous lawn mowers is assisted by the use of mobile devices, it is also desirable to provide a wireless communication means in the module. Of course, the module as a replaceable part can comprise only such wireless module as indicated above already so that such module is dedicated for improving the functionality of an autonomous lawn mower that is already equipped with visual obstacle detection or the like, but not yet configured to communicate wirelessly with a distant mobile device, for example, a mobile phone, tablet and the like. Of course, the wireless communication does not necessarily need to be performed between the autonomous lawn mower equipped with such module and a mobile communication device, but also any other device that is capable of performing wireless communication. Preferred examples for such wireless communication are W-LAN, Bluetooth or NFC. When a video of a camera of the lawn mower is streamed, the wireless communication allows control of the lawn mower to a user even when the lawn mower is out of sight.

Preferred examples of the functions that are performed by the data processing unit of the module are visual obstacle functions, visual odometry functions, visual border recognition functions, visual intruder detection functions or visual grass health analysis. The functions themselves are already known in the art, but up to now as mentioned above, they are fully integrated in the entire system and no updating of hardware and no addition of such functions is possible yet. Thus, according to this aspect of the present invention, such additional functionality is included at least partly in the module which as a replaceable part can replace an old replaceable part of the autonomous lawn mower and thereby add such function or use an updated version of such function. It is self-explanatory that if such function is included in a module, all necessary units like storage, processing unit and sensors are either, which is preferred, comprised by the module or the module may use already present units that are included in the autonomous lawn mower. Exchange of information necessary to provide such functionality is then performed via the electrical connection means.

The system according to the invention comprises an autonomous lawn mower according to one of the aspects mentioned above and a module according to one of the aspects mentioned above with respect to the module.

BRIEF DESCRIPTION OF THE DRAWINGS

The invention will now be described with respect to the annexed drawings. Particular aspects and features will be explained in greater detail using the drawings in which.

DETAILED DESCRIPTION

Figure 1:
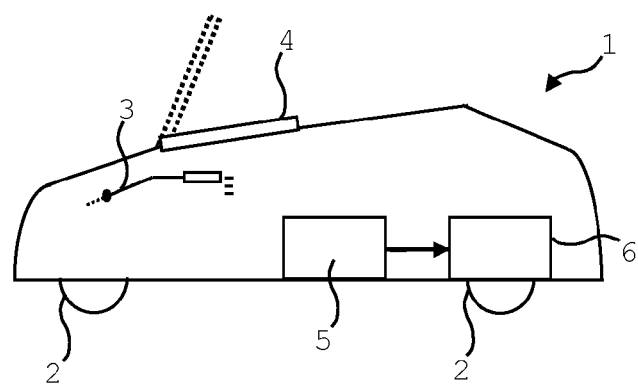
FIG. 1 shows a basic configuration of an autonomous lawn mower according to the state of the art in order to explain the overall configuration of such autonomous lawn mower.

In FIG. 1 there is shown an autonomous lawn mower at it is known from the prior art. The autonomous lawn mower 1 shown there has a basic configuration. Thus, the autonomous lawn mower 1 comprises a plurality of wheels 2 on which the autonomous lawn mower moves. Height adjustment can be performed by a lever 3 that is accessible through a service lid 4. Since this is well known, the mechanical structure of the height adjustment is not shown in the drawing. The service lid 4 can be designed to be fully detached every time the lever 3 is to be operated or, as it is shown in dashed lines in FIG. 1, can be connected to the housing or main cover of the autonomous lawn mower 1 by use hinges provided on one side of the lid.

The autonomous lawn mower 1 is self-propelled. Driving of the autonomous lawn mower 1 is controlled by a control unit 5 that generates driving signals that are supplied to a driving unit 6 which is shown in the figures only very simplified. But the drive unit 6 and the control thereof as such are already well known and such known systems may be used here. The conventional system with autonomous lawn mower 1 as shown in FIG. 1 uses for example a border wire to detect the borders of an area where a lawn shall be mowed and in addition bump sensors (not shown in the drawing) for obstacles that lie within the area the border of which is indicated by the border wire. The control unit 5 controls the speed and direction of the autonomous lawn mower 1 by providing the drive unit 6 with drive signals including speed and steering information.

Figure 2:
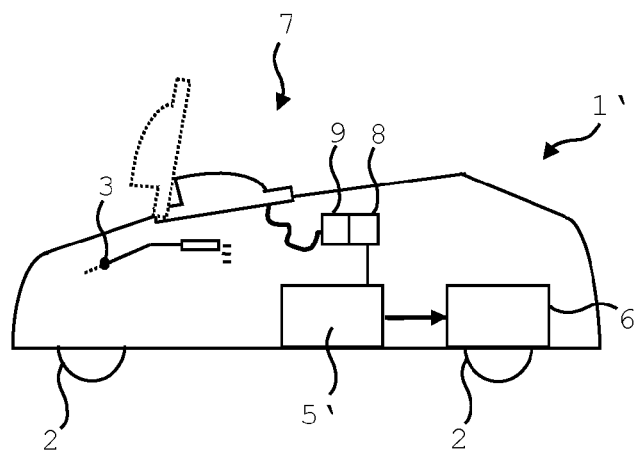
FIG. 2 an autonomous lawn mower according to the present invention to which the module according to the invention has been attached, FIG. 3 an illustration for explaining the functionality after replacement of a replaceable part of the autonomous lawn mower, and FIG. 4 an enlarged view of an example of a module with a camera and wireless communication means.

According to the invention which will hereafter be described in detail on the basis of FIG. 2, the service lid 4 is configured to form a replaceable part and thus one, very simple module that has no electronic parts to be connected. The replaceable part which does not necessarily need to be the service lid 4 but any module that is currently attached to the lawn mower, can be fully detached from the autonomous lawn mower and replaced by another replaceable part which is described as another module according to the invention. It is to be noted that this new replaceable part which substitutes after detaching the original replaceable part this previous replaceable has the same mechanical functionality as the substituted replaceable part. This means in case that the replaceable part is for example the service lid 4 according to the FIG. 1, the new replaceable part which is attached to the autonomous lawn mower 1 thus forms part of the housing or the cover of the autonomous lawn mower 1. But in addition, this new module which is the new replaceable part has additionally functionality. Using such modules increases the functional flexibility of the autonomous lawn 1 mower but avoids that the customer has to buy an autonomous lawn mower with all such functionality right away and thus the costs for the basic configuration can be decreased. The customer can buy for example at the beginning of the grass season a lawn mower with a basic configuration and later on add functionality by buying a module for such increased functionality. Thus, a benefit for the manufacturer is that the sales season is increased because the replaceable parts can be upgrade parts that are bought later.

Thus the present invention provides a modular concept for autonomous lawn mowers.

FIG. 2 shows the overall configuration of such modular autonomous lawn mower 1'. Same parts as of the commonly known autonomous lawn mower 1 as described in FIG. 1 are denoted with the same reference numerals and repetitive description thereof is omitted. FIG. 2 shows the lawn mower 1' according to the present invention where the initially provided service lid 4 is already replaced by a replaceable part which is in the illustrated embodiment a camera module 7. As it is indicated by the dashed lines in FIG. 2 and as it has already been explained above the basic mechanical function of the replaced service lid 4 is maintained by the module 7. This means that the camera module 7 in the present case may be attached to the housing of the autonomous lawn mower 1' by means of hinges so that the camera module 7 can be swung aside and the lever 3 for adjusting the cutting height is still accessible.

An electrical connection between the camera module 7 and the control unit 5' is realized by electrical connecting means 8 which in the simplified illustration comprises a power connector as well as a communication connector. As explained above such communication connector can for example be a CAN bus connector. The electrical connecting means 8 which is provided by the autonomous lawn mower 1' may consist of a plug that is attached to the end of a harness which is connected also to the control unit 5. Such plug can either be fixedly attached to the housing of the autonomous lawn mower 1' or at least be positioned in a region that is reachable after the service lid 4 has been detached. It is essential for the present invention that after detaching the service lid 4—or any other replaceable part that might be mounted there—the electrical connecting means 8 is reachable so that the new replaceable part that substitutes the old one may electrically be connected to the autonomous lawn mower 1'. There are several possibilities to fulfill this requirement. One has already been mentioned and is a connector that is connected to a harness. Another possibility is that there is a socket on the autonomous lawn mower's side and the corresponding module 7 has a plug that can be inserted into the socket. In any case it has to be ensured that the original mechanical functionality of the originally used service lid 4 can still be fulfilled. Of course it would be possible that the electrical connecting means 8, meaning the socket, plug or connector is provided so as to be reachable on the outside of the housing of the autonomous lawn mower but of course it is preferable that the electrical connecting means 8 is covered by the housing of the autonomous lawn mower 1' and thus is arranged inside the autonomous lawn mower 1' close to the opening which is covered by the service lid 4.

The module 7 of course has a counterpart 9 to the electrical connecting means 8, in the easiest case a plug that fits into the socket. Such plug preferably is attached to the end of a module harness 10 which is long enough that opening of the housing of the autonomous lawn mower 1' can still be performed as shown on the right side of FIG. 2 in order to access the lever 3 for height adjustment.

Figure 4:
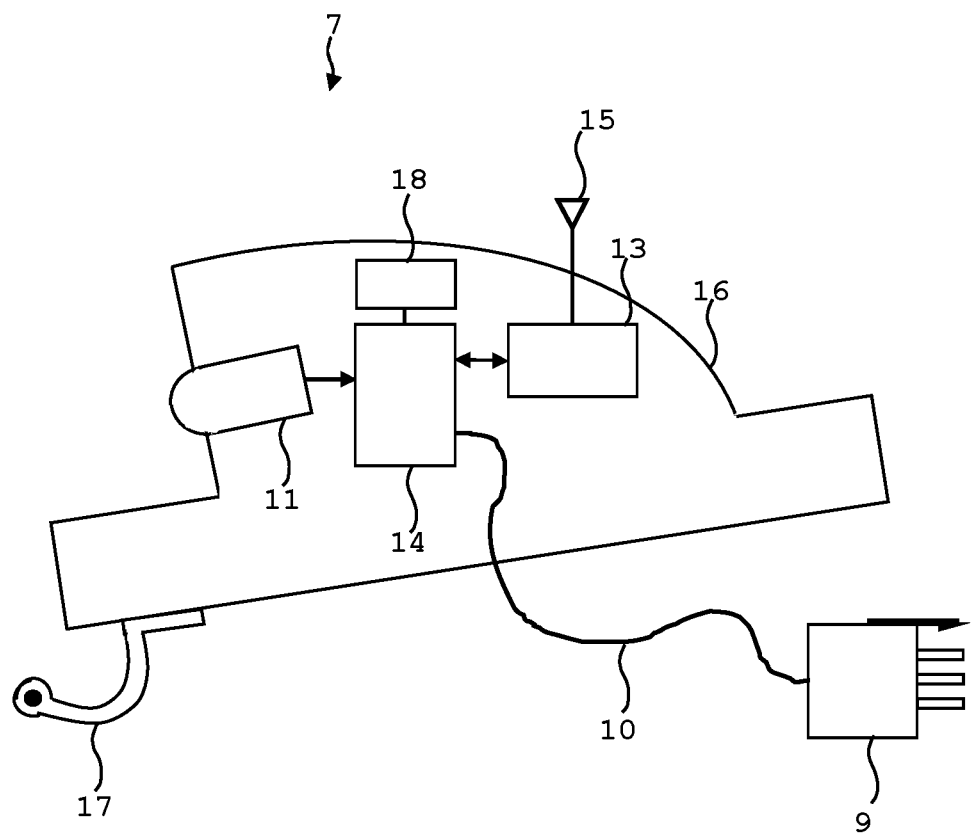

The module 7 as shown enlarged in FIG. 4 preferably comprises a camera 11. The camera 11 captures images of the environment of the autonomous lawn mower 1' and preferably the camera 11 even comprises an image processing unit 14 that directly processes the images captured in order to generate a signal that is used by the control unit 5' for generating the drive signal. Power is supplied to the module 7 by the electrical connection means 8 that also is capable of transferring the signals that are generated by a signal generation unit of the module 7 to the control unit 5'. On the basis of these signals that are provided by the module 7 the control unit 5' then finally generates the drive signals that are supplied to the drive unit 6. The signal generation unit in the embodiment comprises at least the camera 11 and a data processing unit 14, preferably also a wireless communication module 13 and a storage 18.

In the storage 18 software (and/or parameters) for updating software (and/or parameters) that is run in the control unit 5' is stored. When the module 7 is connected to the control unit 5' a software (and/or parameter) update can be performed. The update may either start automatically after the connection is established or can be triggered by a user.

Figure 3:
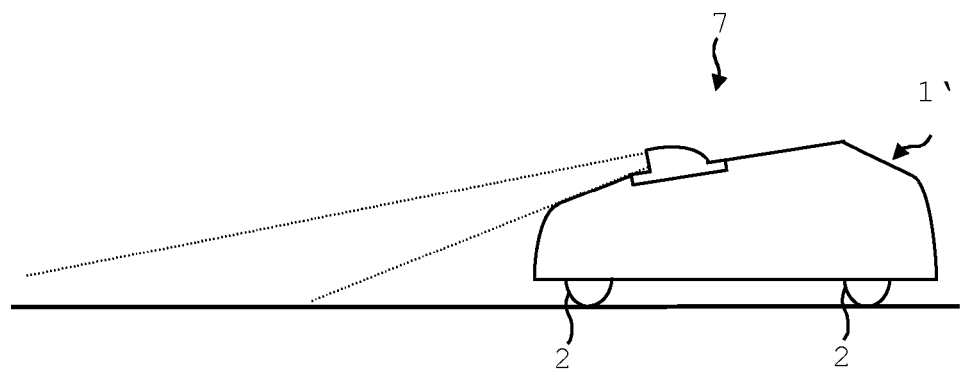

The module 7 is designed so that it integrates smoothly in the overall design of the autonomous lawn mower 1' whereby it particularly fulfills also the mechanical function of the replaced module. In the present case a housing 16 is fixed to a base plate. The base plate is attached to the autonomous lawn mower 1' by hinges 17 that enable a pivotal movement of the entire module 7 thereby allowing the same access to the inside as the lid 2. The connection of the signal generation unit is realized in the illustrated embodiment by a cable or harness 10 one side of which is connected to the processing unit 14. At the other end the counterpart 9 is attached to the cable or harness 10. The length of the cable or harness 10 is chosen so that the pivotal movement of the module 7 is not limited and that operation of elements covered by the module 7 in the closed state, like the lever 3 is possible Since the service lid 4 in most cases is located at the upper side of the housing of the autonomous lawn mower 1', the position of a camera 11 included in module 7 provides a good viewing angle as shown in FIG. 3. Thus, remote controlling of the autonomous lawn mower 1' by a user or obstacle detection is easily possible. In order to provide the functionality of remote controlling the module 7 in addition to the camera 11 comprises said wireless communication unit 13 that can for example directly transmit the images captured by the camera to a remote device like, for example, a cell phone or a tablet or any other device that is also capable of wireless communication. The wireless communication unit 13 is connected to an antenna 15 that may be arranged inside housing 16 of the module 7 as well. Wireless communication could be near field communication (NFC), Bluetooth or in case that larger distances shall be also possible, wireless LAN.

Due to the modular system it is of course also possible to remove the module with the camera 7 again in case that new versions of camera or additional image processing capabilities are included in newer replaceable parts an upgrade of the entire system can be achieved.

The invention claimed is:
1. An autonomous lawn mower, comprising:
   a control unit in electrical connection with electrical connection means; and
   at least one replaceable part,
   wherein the electrical connection means is located such that connection and disconnection of the electrical connection means and a counterpart of the replaceable part can be performed when replacing the replaceable part,
   wherein the replaceable part is configured to form a service lid, and
   wherein the replaceable part is configured to add or adapt a functionality of the autonomous lawn mower while simultaneously serving a same original purpose as the service lid.
2. The autonomous lawn mower according to claim 1, wherein the control unit and the electrical connection means are configured to control a drive unit of the autonomous lawn mower based upon signals receivable via the electrical connection means.

3. The autonomous lawn mower according to claim 1, wherein the electrical connection means comprises a power connector or a communication connector.

4. The autonomous lawn mower according to claim 3, wherein the communication connector is a CAN bus connector.

5. The autonomous lawn mower according to claim 1, wherein the control unit is updated via the electrical connection means.

6. The autonomous lawn mower according to claim 1, further comprising:
a plurality of replaceable parts and respective electrical connection means that allow communication of the plurality of replaceable parts when connected to the electrical connection means.

7. An autonomous lawn mower system comprising an autonomous lawn mower according to claim 1, the autonomous lawn mower system further comprising:
a module being configured to replace a replaceable part of the autonomous lawn mower, said module comprising a signal generation unit and a counterpart for an electrical connection means of the autonomous lawn mower for transmitting electrical signals to a control unit of the autonomous lawn mower, and
wherein the module is simultaneously configured to add or adapt a functionality to the autonomous lawn mower.

8. A module for an autonomous lawn mower configured to replace a replaceable part of a lawn mower, the module comprising:
a signal generation unit; and
a counterpart for an electrical connection means of the lawn mower for transmitting electrical signals to a control unit of the autonomous lawn mower, wherein the module is configured to replace a service lid as the replaceable part and to maintain a function of a service lid, and the module is simultaneously configured to add or adapt a functionality to the autonomous lawn mower.

9. The module according to claim 8, wherein the signal generation unit comprises a camera.

10. The module according to claim 9, wherein the signal generation unit comprises a data processing unit configured to generate signals for assisting control of the autonomous lawn mower on the basis of images captured by the camera.

11. The module according to claim 10, wherein the data processing unit is configured to perform at least one of a visual obstacle function, a visual odometry function, a visual border recognition function, a visual intruder detection function, or a visual grass health analysis.

12. The module according to claim 8, wherein the signal generation unit further comprises wireless communication means.

13. The module according to claim 12, wherein the wireless communication means comprises at least one of a wireless land area network, a Bluetooth, or a near field communication (NFC).

14. The module according to claim 8, wherein the module comprises a storage on which a software or parameters for the control unit of the autonomous lawn mower is stored.

* * * * *